(12) United States Patent
Moon et al.

(10) Patent No.: US 7,395,092 B2
(45) Date of Patent: Jul. 1, 2008

(54) RADIO NETWORK CONTROLLER AND MOBILE COMMUNICATION CONTROL METHOD

(75) Inventors: Sung Uk Moon, Yokosuka (JP); Takehiro Nakamura, Yokosuka (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 722 days.

(21) Appl. No.: 11/044,191

(22) Filed: Jan. 28, 2005

(65) Prior Publication Data

US 2005/0186916 A1  Aug. 25, 2005

(30) Foreign Application Priority Data

Jan. 28, 2004  (JP) .............................. 2004-020449

(51) Int. Cl.
  *H04Q 7/20* (2006.01)
  *H04Q 7/32* (2006.01)
(52) U.S. Cl. .............. 455/560; 455/550.1; 455/436; 455/422.1; 455/439; 455/67.11; 370/328; 370/331; 370/310
(58) Field of Classification Search .............. 455/560, 455/550.1, 436–445, 422.1, 426.1, 426.2, 455/500, 517, 67.11, 423, 424, 425; 370/328, 370/329, 331, 338
See application file for complete search history.

(56) References Cited

U.S. PATENT DOCUMENTS 5,905,718 A * 5/1999 Kurokami et al. ........... 370/328

2005/0070285 A1 * 3/2005 Goransson .................. 455/436

FOREIGN PATENT DOCUMENTS

| CN | 1283945 A | 2/2001 |
| CN | 1291010 A | 4/2001 |
| JP | 9-261711 | 10/1997 |
| JP | 2001-45539 | 2/2001 |
| JP | 2001-103529 | 4/2001 |
| JP | 2002-171548 | 6/2002 |
| JP | 2002-232353 | 8/2002 |
| JP | 2003-32725 | 1/2003 |
| JP | 2003-319429 | 11/2003 |
| JP | 2003-324762 | 11/2003 |

* cited by examiner

*Primary Examiner*—Keith T Ferguson
(74) *Attorney, Agent, or Firm*—Oblon, Spivak, McClelland, Maier & Neustadt, P.C.

(57) ABSTRACT

In a mobile communication system, same downlink signals can be transmitted to a mobile station via a plurality of base stations. A radio network controller in the mobile station includes an acquirer configured to acquire a reception quality of the downlink signal in the mobile station; a determiner configured to determine, based on an acquired reception quality, whether or not to transmit the same downlink signals to the mobile station via a first base station managing a first cell in which the mobile station is located and a second base station managing a second cell adjacent to the first cell; and an instructor configured to instruct the second base station to transmit the downlink signal to the mobile station.

7 Claims, 4 Drawing Sheets

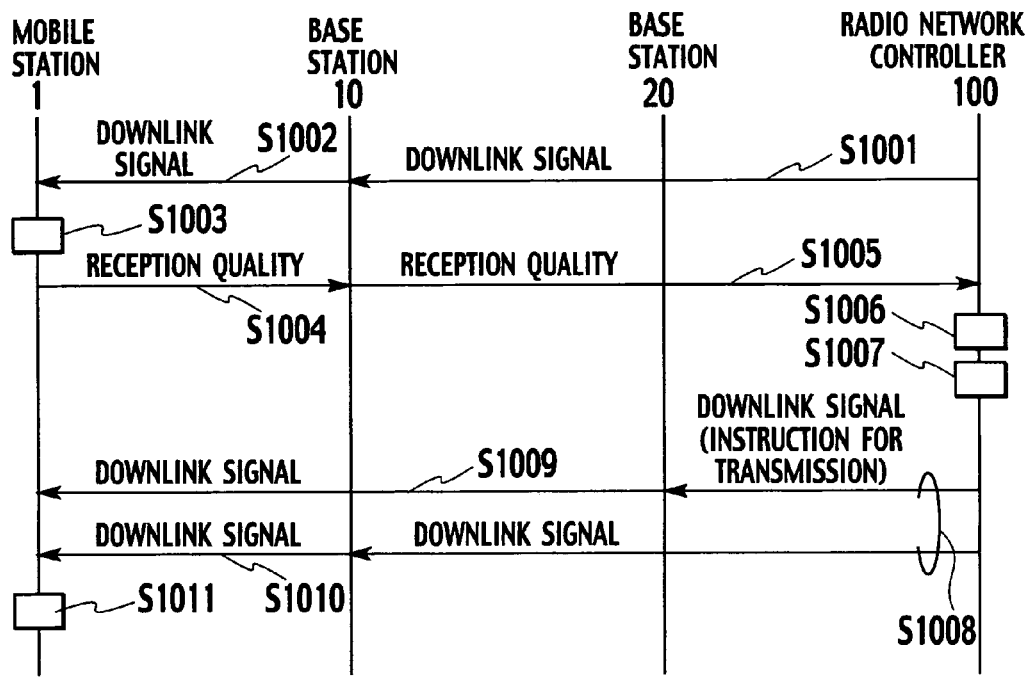
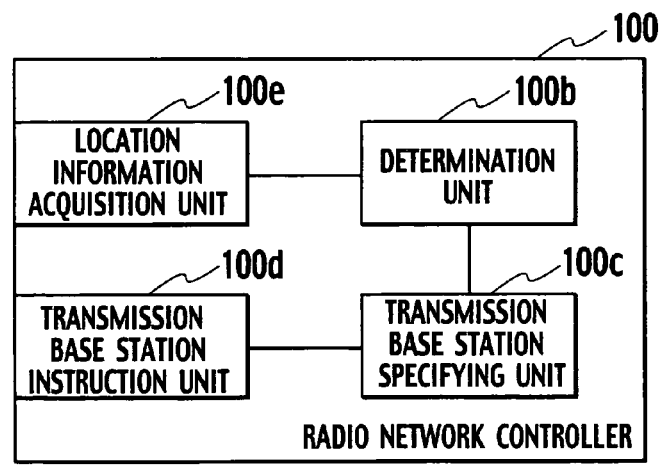

RADIO NETWORK CONTROLLER AND MOBILE COMMUNICATION CONTROL METHOD

CROSS REFERENCE TO RELATED APPLICATION

This application is based upon and claims the benefit of priority from the prior Japanese Patent Application No. P2004-020449, filed on Jan. 28, 2004; the entire contents of which are incorporated herein by reference.

BACKGROUND OF THE INVENTION

1. Field of the Invention

The present invention relates to a radio network controller used in a mobile communication system in which same downlink signals can be transmitted to a mobile station via a plurality of base stations, and a mobile communication control method for controlling the mobile communication system.

2. Description of the Related Art

In a conventional second-generation mobile communication system, such as PDC (Personal Digital Cellular) system, a "hard handover method" is employed when a mobile station moves between cells (sectors) during mobile communications. In this hard handover method, a radio communication link between the mobile station and a base station which manages the origination cell (sector) of the handover is firstly released, and then a radio communication link between the mobile station and a base station which manages the destination cell (sector) of the handover is set up.

On the other hand, in a CDMA (Code Division Multiple Access) mobile communication system, a "diversity handover method" is employed when a mobile station moves between cells (sectors) during mobile communications. In this diversity handover method, a radio communication link between the mobile station and a base station which manages the destination cell (sector) of the handover is set up, before a radio communication link between the mobile station and a base station which manages the origination cell (sector) of the handover is released.

In the diversity handover method, when the mobile station is located in a predetermined area near the border between cells (sectors), the mobile station is configured to set up a plurality of radio communication links so as to communicate with a plurality of base stations which manage those cells (sectors).

Further, in the diversity handover method, the mobile station is configured to perform "selective combining process" during the diversity handover process. In the selective combining process, the mobile station selects and receives the most reliable information from among information included in a plurality of downlink signals transmitted from a plurality of base stations, based on reliability information corresponding to reception qualities of those downlink signals (e.g. CRC check results, reception power, reception SIR, or the like).

However, in such conventional mobile communication systems, even if same downlink signals are transmitted via a plurality of base stations, the mobile station may select information included in a particular downlink signal according to the reception qualities of the downlink signals in the mobile station or location information of the mobile station. As a result, there has been a problem that transmitting those downlink signals, which are not selected by the mobile station, is wasted.

Further, in such conventional mobile communication systems, except during the diversity handover process, downlink signals are not transmitted via the second base station managing the second cell adjacent to the first cell in which the mobile station is located. Therefore, there has been a problem that the mobile station cannot perform selective combining process even when the reception quality of the downlink signal in the first cell is damaged or the mobile station is located away from the first base station, such as an area near the border between the first cell and the second cell.

BRIEF SUMMARY OF THE INVENTION

The present invention has been made in view of the above problems, and has an object of providing a radio network controller and a radio communication control method which can improve the reception quality of the downlink signal in the mobile station and utilize radio resources effectively, by transmitting the same downlink signals from both the first radio station and the second base station in accordance with the location information of the mobile station and the reception quality of the downlink signal in the mobile station.

A first aspect of the present invention is summarized as a radio network controller in a mobile communication system in which same downlink signals can be transmitted to a mobile station via a plurality of base stations. The radio network controller includes an acquirer configured to acquire a reception quality of the downlink signal in the mobile station; a determiner configured to determine, based on an acquired reception quality, whether or not to transmit the same downlink signals to the mobile station via a first base station managing a first cell in which the mobile station is located and a second base station managing a second cell adjacent to the first cell; and an instructor configured to instruct the second base station to transmit the downlink signal to the mobile station.

A second aspect of the present invention is summarized as radio network controller in a mobile communication system in which same downlink signals can be transmitted to a mobile station via a plurality of base stations. The radio network controller includes an acquirer configured to acquire location information of the mobile station; a determiner configured to determine, based on acquired location information, whether or not to transmit the same downlink signals to the mobile station via a first base station managing a first cell in which the mobile station is located and a second base station managing a second cell adjacent to the first cell; and an instructor configured to instruct the second base station to transmit the downlink signal to the mobile station.

In the second aspect, the determiner can be configured to determine to transmit the same downlink signals to the mobile station via the first base station and the second base station, when the determiner judges that the mobile station is located in a predetermined area based on the location information.

A third aspect of the present invention is summarized as a radio network controller in a mobile communication system in which same downlink signals can be transmitted to a mobile station via a plurality of base stations. The radio network controller includes an acquirer configured to acquire a selective combining result in the mobile station; a determiner configured to determine, based on an acquired selective combining result, whether or not to transmit the same downlink signals to the mobile station via a first base station managing a first cell in which the mobile station is located and a second base station managing a second cell adjacent to the first cell; and an instructor configured to instruct the second base station to stop transmitting the downlink signal to the mobile station.

A fourth aspect of the present invention is summarized as a mobile communication control method. The method includes measuring, in a mobile station, a reception quality of a downlink signal received via a first base station managing a first cell in which the mobile station is located; acquiring, in a radio network controller, the reception quality in the mobile station; determining, in the radio network controller, based on an acquired reception quality, whether or not to transmit same downlink signals to the mobile station via a first base station managing a first cell in which the mobile station is located and a second base station managing a second cell adjacent to the first cell; instructing, in the radio network controller, the second base station to transmit the downlink signal to the mobile station; and performing, in the mobile station, combining process on the same downlink signals received via the first base station and the second base station.

A fifth aspect of the present invention is summarized as a mobile communication control method. The method includes acquiring, in a radio network controller, location information of a mobile station; determining, in the radio network controller, based on acquired location information, whether or not to transmit same downlink signals to the mobile station via a first base station managing a first cell in which the mobile station is located and a second base station managing a second cell adjacent to the first cell; instructing, in the radio network controller, the second base station to transmit the downlink signal to the mobile station; and performing, in the mobile station, combining process on the same downlink signals received via the first base station and the second base station.

A sixth aspect of the present invention is summarized as a mobile communication control method. The method includes performing, in a mobile station, selective combining process on same downlink signals received via a first base station managing a first cell in which the mobile station is located and a second base station managing a second cell adjacent to the first cell; acquiring, in a radio network controller, a result of the selective combining process in the mobile station; determining, in the radio network controller, based on an acquired result of selective combining process, whether or not to transmit the same downlink signals to the mobile station via the first base station and the second base station; and instructing, in the radio network controller, the second base station to stop transmitting the downlink signal to the mobile station.

BRIEF DESCRIPTION OF THE SEVERAL VIEWS OF THE DRAWINGS

FIG. 3 is a sequence diagram showing a mobile communication control method according to the first embodiment of the present invention;

FIG. 4 is a functional block diagram of a radio network controller according to a second embodiment of the present invention;

DETAILED DESCRIPTION OF THE INVENTION

Figure 1:
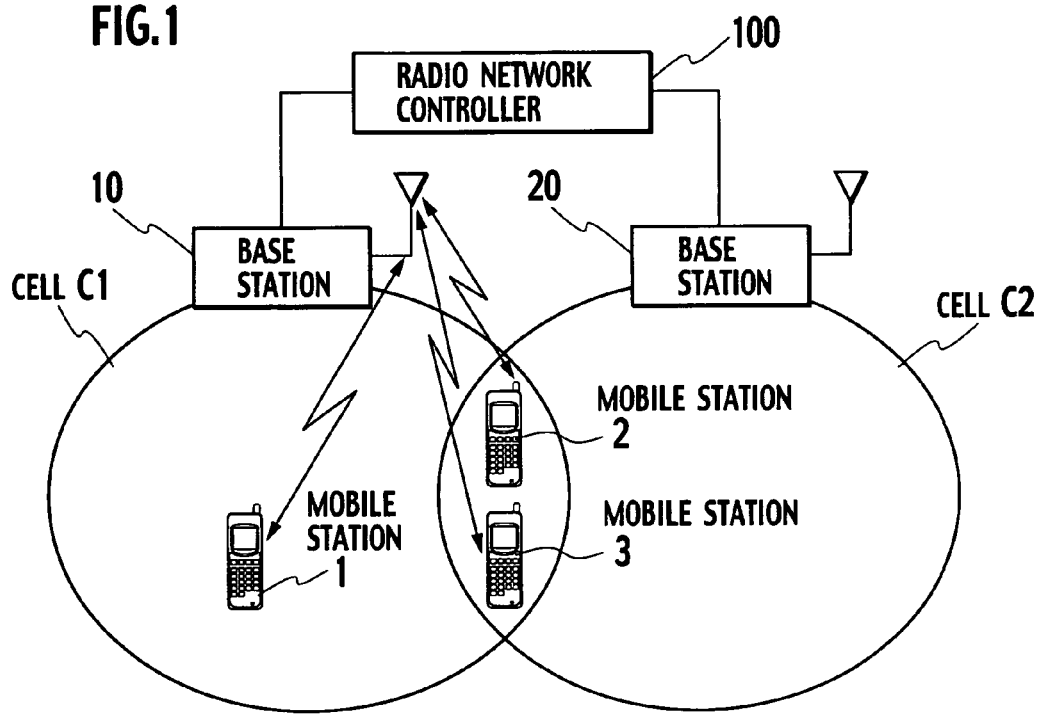
FIG. 1 is a view of an entire configuration of a mobile communication system according to embodiments of the present invention.

FIG. 1 is a view showing a configuration of a mobile communication system according to embodiments of the present invention. As shown in FIG. 1, the mobile communication systems according to the embodiments include two base stations 10 and 20 under control of a radio network controller 100. The base station 10 manages a cell C1 and the base station 20 manages a cell C2.

Further, in the mobile communication systems according to the embodiments, the mobile stations 1 to 3 are located in the cell C1 which is controlled by the base station 10. Here, the base station 10 is referred as a "first base station" managing a first cell C1 in which the mobile stations 1 to 3 are located. The base station 20 is referred as a "second base station" managing a second cell C2 which is adjacent to the first cell C1.

Here, the word "cell" used in the embodiments includes the aspects of both conventional cells and sectors. In the mobile communication systems according to the embodiments, the base stations 10 and 20 are configured to be able to transmit same downlink signals to mobile stations 1 to 3 which are located in a plurality of cells C1 and C2.

The mobile stations 1 to 3 are configured to be able to perform combining process (selective combining process, soft combining process or the like) on the same downlink signals transmitted from the base stations (the first base station 10 and the second base station 20).

An example of the case where same downlink signals are transmitted to the mobile station 1 via the plurality of base stations 10 and 20 will be described in the following embodiments.

Mobile Communication System According to a First Embodiment of the Present Invention Referring to FIGS. 2 and 3, a mobile communication system according to the first embodiment of the present invention will be described.

Figure 2:
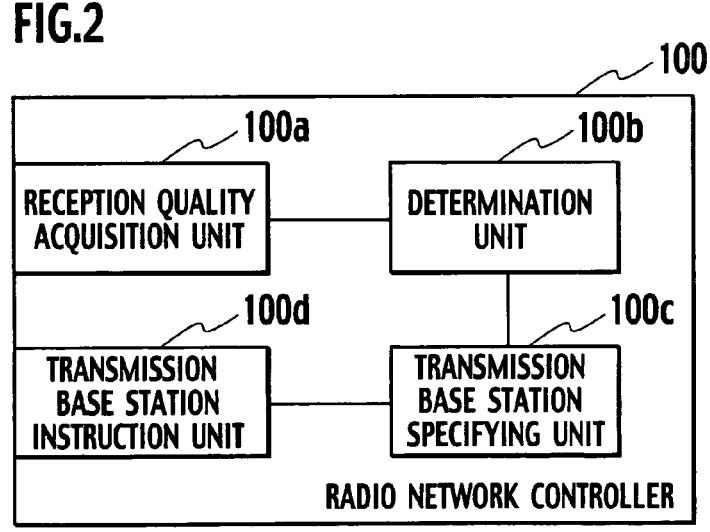
FIG. 2 is a functional block diagram of a radio network controller according to a first embodiment of the present invention.

As shown in FIG. 2, the radio network controller 100 includes a reception quality acquisition unit 100a, a determination unit 100b, a transmission base station specifying unit 100c and a transmission base station instruction unit 100d.

The reception quality acquisition unit 100a is configured to acquire a reception quality of a downlink signal in the mobile station 1. Specifically, the reception quality acquisition unit 100a receives the reception quality of the downlink signal (e.g. CRC check results, reception power, reception SIR or the like) periodically reported by the mobile station 1.

The determination unit 100b is configured to determine whether or not to transmit same downlink signals to the mobile station 1 via the first base station (base station 10) and the second base station, based on the reception quality of the downlink signal acquired by the reception quality acquisition unit 100a.

Specifically, the determination unit 100b determines to start transmitting the downlink signal to the mobile station 1 via the second base station when the reception quality of the downlink signal in the mobile station 1 does not satisfy a predetermined reception quality level.

For example, in the cases where CRC check processing fails predetermined times (e.g. three times), the power to interference ratio (Ec/N0, SIR, etc.) of a common pilot channel (CPICH) or a data channel is smaller than a predetermined threshold (e.g. −100 dB), the reception power (RSCP: Received signal code power) is smaller than a predetermined threshold (e.g. −100 dBm), or the like, the determination unit 100b determines to start transmitting the downlink signal to the mobile station 1 via the second base station.

In other words, the determination unit 100b determines that it is not necessary to transmit the downlink signal to the mobile station 1 via the second base station when the reception quality of downlink signal in the mobile station 1 satisfies the predetermined reception quality level.

The transmission base station specifying unit 100c is configured to specify the second base station managing the second cell adjacent to the first cell C1 in which the mobile station 1 is located, when the determination unit 100b determines to start transmitting the downlink signals to the mobile station 1 via the second base station. The base station 20 is specified as the second base station in the present embodiment.

The transmission base station instruction unit 100d is configured to instruct the specified second base station (base station 20), which is specified by the transmission base station specifying unit 100c, to transmit the downlink signal to the mobile station 1.

Referring to FIG. 3, an operation of the mobile communication system according the present embodiment will be described.

As shown in FIG. 3, in step S1001, the radio network controller 100 transmits a downlink signal to the first base station (base station 10) managing the first cell C1 in which the mobile station 1 is located. Instep S1002, the base station 10 transmits the downlink signal to the mobile station 1 via a radio communication link.

The mobile station 1 measures the reception quality of the received downlink signal in step S1003, and periodically reports the measured reception quality to the radio network controller 100 in steps S1004 and S1005.

In step S1006, the radio network controller 100 determines to transmit the same downlink signals to the mobile station 1 via the first base station (base station 10) and the second base station, when it is judged that the reception quality of the downlink signal transmitted from the mobile station 1 does not satisfy a predetermined reception quality level.

In step S1007, the radio network controller 100 specifies the second base station (base station 20) managing the second cell (cell C2) adjacent to the first cell C1 in which the mobile station 1 is located.

In step S1008, the radio network controller 100 transmits the same downlink signals to the first base station 10 and the second base station 20. Here, the radio network controller 100 instructs the second base station 20 to transmit the downlink signal to the mobile station 1.

In step S1009, the second base station 20 transmits the received downlink signal to the mobile station 1 via radio communication link. In step S1010, the first base station 10 transmits the received downlink signal to the mobile station 1 via a radio communication link.

In step S1011, the mobile station 1 performs selective combining process (or soft combining process) on the same downlink signals received from the first base station 10 and the second base station 20.

According to the mobile communication system of the present embodiment, when the reception quality of the downlink signal is damaged, the same downlink signals are transmitted via the first base station 10 and the second base station 20. Thus, the mobile station 1 can perform selective combining process (or soft combining process) and the reception quality of the downlink signal in the mobile station 1 can be improved.

Mobile Communication System According to s Second Embodiment of the Present Invention Referring to FIGS. 4 and 5, a mobile communication system according to a second embodiment of the present invention will be described. In the mobile communication system according to the present embodiment, especially the differences from the above-described mobile communication system of the first embodiment, will be explained.

As shown in FIG. 4, the radio network controller 100 according to the present embodiment includes a location information acquisition unit 100e in place of the reception quality acquisition unit 100a.

The location information acquisition unit 100e is configured to acquire location information of the mobile station 1. The location information acquisition unit 100e, for example, may acquire location information of the mobile station 1 in use of time difference or direction of radio waves which are transmitted from the mobile station 1 and reach to, or may acquire location information (latitude information or longitude information) of the mobile station 1 in use of the Global Positioning System.

Further, the location information acquisition unit 100e may acquire location information of the mobile station 1 in every prescribed period of time, or may acquire location information of the mobile station 1 when the mobile station 1 enters in (or leaves from) a predetermined area in the first cell C1.

The determination unit 100b is configured to determine whether or not to transmit the same downlink signals to the mobile station 1 via the first base station (base station 10) and the second base station, based on the location information of the mobile station 1, which is acquired by the location information acquisition unit 100e.

Specifically, the determination unit 100b determines to transmit the same downlink signals to the mobile station 1 via the first base station (base station 10) and the second base station, when it is judged that the mobile station 1 is located in a predetermined area based on the location information of the mobile station 1.

The determination unit 100b can be configured to determine the location of the mobile station 1 in accordance with the latitude information or the longitude information acquired by the location information acquisition unit 100e.

The determination unit 100b can be configured to estimate the location of the mobile station 1 in accordance with signals which are transmitted from the mobile station 1 and received at more than three base stations.

The determination unit 100b can be configured to determine the location of the mobile station 1 in accordance with the location information which the mobile station 1 calculates by using the signal transmitted from more than three base stations and reports to the radio network controller 100.

Here, an area near the border between the first cell C1 and the second cell C2 (e.g. an area within a predetermined distance from the border between the first cell C1 and the second cell C2) can be set as the predetermined area.

Figure 5:
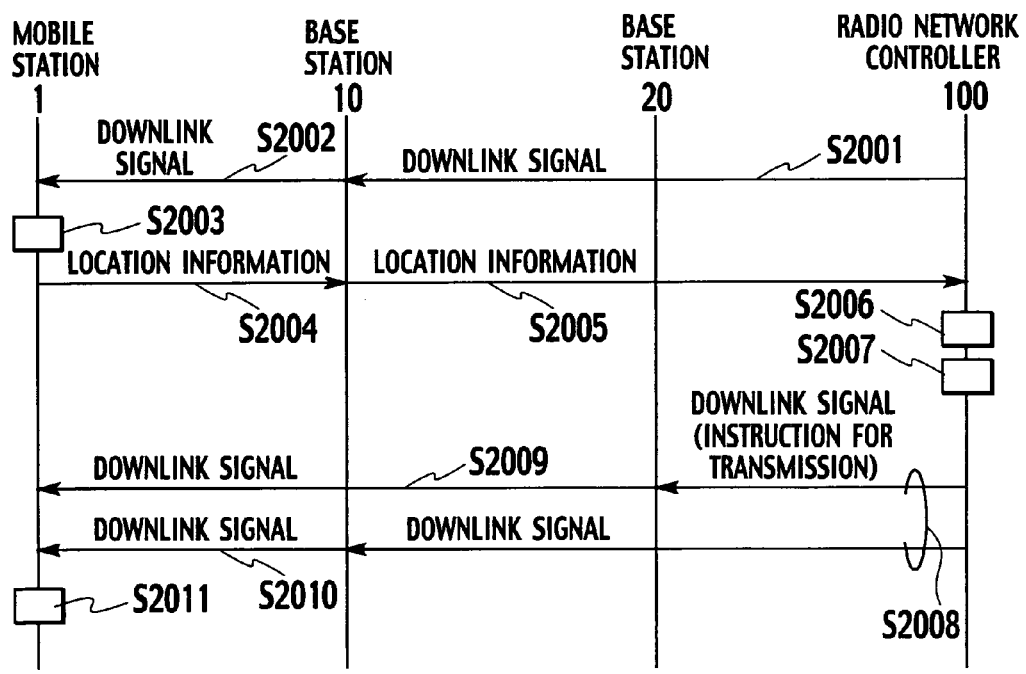
FIG. 5 is a sequence diagram showing a mobile communication control method according to the second embodiment of the present invention.

Referring to FIG. 5, an operation of the mobile communication system according to the present embodiment will be described.

As shown in FIG. 5, in step S2001, the radio network controller 100 transmits the downlink signal to the first base station (base station 10) managing the first cell C1 in which the mobile station 1 is located. Instep S2002, the base station 10 transmits the downlink signal to the mobile station 1 via a radio communication link.

In step S2003, the mobile station 1 enters into the predetermined area in the first cell C1. In steps S2004 and S2005, the mobile station 1 reports its location information to the radio network controller 100.

In step S2006, when it is judged that the mobile station 1 is located in the predetermined area based on the received location information of the mobile station 1, the radio network controller 100 determines to transmit the same downlink signals to the mobile station 1 via the first base station (base station 10) and the second base station.

Instep S2007, the radio network controller 100 specifies a second base station (base station 20) managing the second cell (cell C2) adjacent to the first cell C1 in which the mobile station 1 is located.

In step S2008, the radio network controller 100 transmits the same downlink signals to the first base station 10 and the second base station 20. Here, the radio network controller 100 instructs the second base station 20 to transmit the downlink signal to the mobile station 1.

In step S2009, the second base station 20 transmits the received downlink signal to the mobile station 1 via a radio communication link. In step S2010, the first base station 10 transmits the received downlink signal to the mobile station 1 via a radio communication link.

In step S2011, the mobile station 1 performs selective combining process (or soft combining process) on the same downlink signals which are received via the first base station 10 and the second base station 20.

According to the mobile communication system of the present embodiment, when the mobile station is located in an area geographically distant from the first base station such as an area near the border between the first cell and the second cell (a predetermined area), the same downlink signals are transmitted via the first base station 10 and the second base station 20. Therefore, the mobile station 1 can perform selective combination process (or soft combining process) and the reception quality of the downlink signal in the mobile station 1 can be improved.

Mobile Communication System According to a Third Embodiment of the Present Invention Referring to FIGS. 6 and 7, a mobile communication system according to a third embodiment of the present invention will be described. Especially the mobile communication system of the present embodiment will be explained with its differences from the above-described mobile communication system of the first embodiment.

Figure 6:
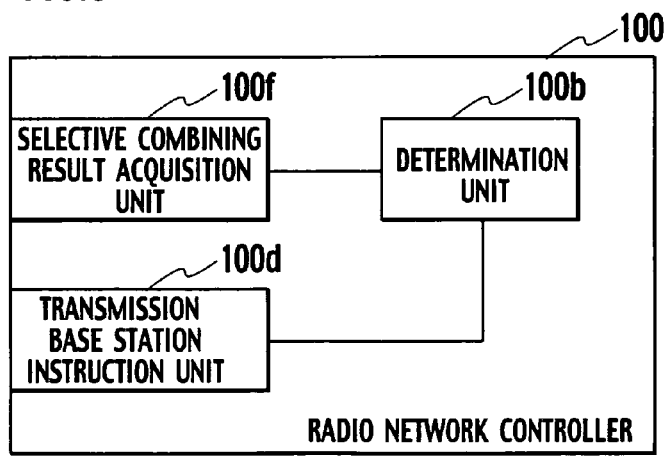
FIG. 6 is a functional block diagram of a radio network controller according to a third embodiment of the present invention.

As shown in FIG. 6, the radio network controller 100 of the present embodiment includes a selective combining result acquisition unit 100$f$ in place of the reception quality acquisition unit 100$a$ in the radio network controller 100 of the first embodiment.

The selective combining result acquisition unit 100$f$ is configured to acquire a selective combining result in a mobile station 1. Specifically, the selective combining result acquisition unit 100$f$ acquires information of a base station (e.g. a first base station 10 or a second base station 20) which transmits the downlink signal including downlink information selected in the selective combining process in the mobile station 1.

The selective combining result acquisition unit 100$f$ may be configured to acquire actively the selective combining results in every predetermined period of time, or acquire the selective combining results transmitted from the mobile station 1.

A determination unit 100$b$ is configured to determine whether or not to transmit same downlink signals to the mobile station 1 via the first base station 10 and the second base station 20, based on the selective combining result acquired by the selective combining result acquisition unit 100$f$.

For example, the same downlink signals are transmitted to the mobile station 1 via the first base station 10 and the second base station 20, when the mobile station 1 moves away from the predetermined area, or the communication condition between the mobile station 1 and the second base station 20 is damaged or interrupted.

The determination unit 100$b$ determines to stop transmitting the downlink signal to the mobile station 1 via the second base station 20, in the case where the mobile station selects the downlink information included in the downlink signal from the first base station 10 predetermined times (e.g. three times) consecutively.

The determination unit 100$b$ can be configured to determine to stop transmitting the downlink signal to the mobile station 1 via the second base station 20, in the case where the error rate which is measured after the selective combing process on the data channels is smaller than a predetermined threshold, the mobile station 1 can receive signals which satisfy the required power level without receiving signals form a specified base stations.

The transmission base station instruction unit 100$d$ is configured to instruct the second base station 20, which is transmitting the downlink signal, to stop transmitting the downlink signal to the mobile station 1.

Figure 7:
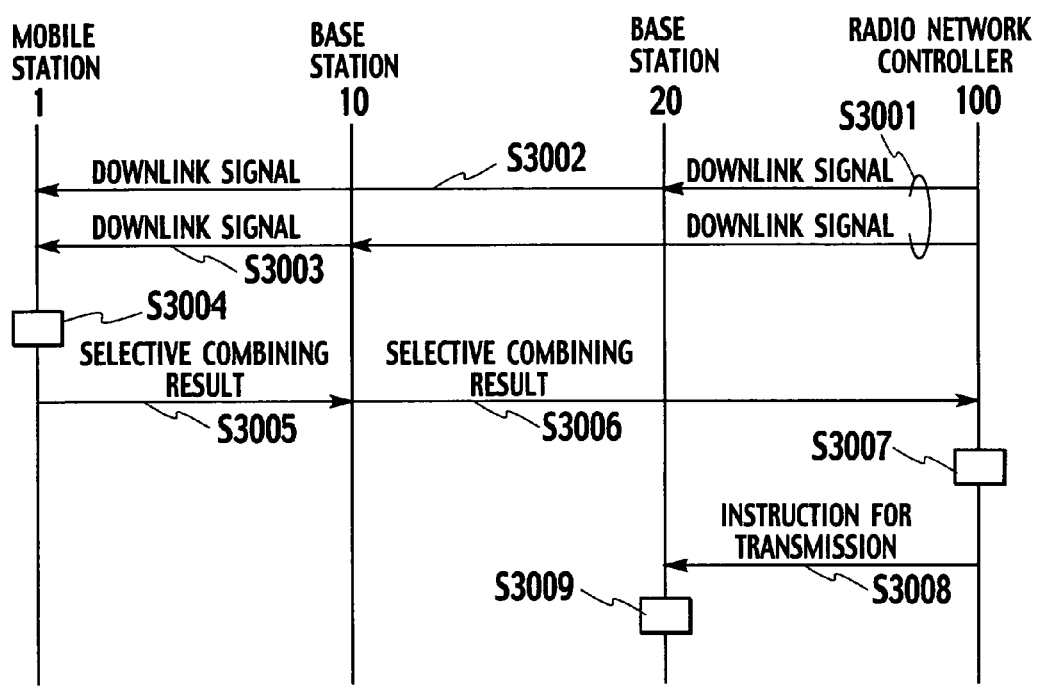
FIG. 7 is a sequence diagram showing a mobile communication control method according to the third embodiment of the present invention.

Referring to FIG. 7, an operation of the mobile communication system according to the present embodiment will be described.

As shown in FIG. 7, in step S3001, the radio network controller 100 transmits the same downlink signals to the first base station 10 and the second base station 20.

In step S3002, the second base station transmits the received downlink signal to the mobile station 1 via a radio communication link. In step S3003, the first base station transmits the received downlink signal to the mobile station 1 via a radio communication link.

In step S3004, the mobile station 1 performs selective combining process on the received downlink signals from the first base station 10 and the second base station 20. As shown in the example in FIG. 7, the mobile station 1 selects downlink information included in the downlink signal received from the first base station 10 as reception information.

In steps S3005 and S3006, the mobile station 1 reports, to the radio network controller 100, the selective combining result in step S3004, that is, selective of the downlink information included in the downlink signal received from the first base station 10 as reception information.

Here, the mobile station 1 may configured to report the selective combining results in every prescribed period of time, or report the selective combining result when the downlink information included in the downlink signal from a same base station is selected as reception information predetermined number of times consecutively.

In step S3007, the radio network controller 100 determines whether or not to transmit the same downlink signals to the mobile station 1 via the first base station 10 and the second base station 20, based on the selective combining result in the mobile station 1.

In the example shown in FIG. 7, the radio network controller 100 determines to stop transmitting the downlink signal to mobile station 1 via the second base station, when the mobile station 1 selects the downlink information included in the downlink signal received via the first base station three times consecutively.

In step S3008, the radio network controller 100 instructs the second base station to stop transmitting the downlink signals to the mobile station 1.

According to the mobile communication system of the present embodiment, the transmission of same downlink signal via the second base station 20 is stopped, when the mobile station 1 selects the downlink signals from the first base station consecutively. As a result, an effective utilization of radio resources can be achieved.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio network controller in a mobile communication system in which same downlink signals can be transmitted to a mobile station via a plurality of base stations, comprising:
   an acquirer configured to acquire a reception quality of the downlink signal in the mobile station;
   a determiner configured to determine, based on an acquired reception quality, whether or not to transmit the same downlink signals to the mobile station via a first base station managing a first cell in which the mobile station is located and a second base station managing a second cell adjacent to the first cell; and
   an instructor configured to instruct the second base station to transmit the downlink signal to the mobile station.

2. A radio network controller in a mobile communication system in which same downlink signals can be transmitted to a mobile station via a plurality of base stations, comprising:
   an acquirer configured to acquire location information of the mobile station;
   a determiner configured to determine, based on acquired location information, whether or not to transmit the same downlink signals to the mobile station via a first base station managing a first cell in which the mobile station is located and a second base station managing a second cell adjacent to the first cell; and
   an instructor configured to instruct the second base station to transmit the downlink signal to the mobile station.

3. The radio network controller of claim 2, wherein the determiner is configured to determine to transmit the same downlink signals to the mobile station via the first base station and the second base station, when the determiner judges that the mobile station is located in a predetermined area based on the location information.

4. A radio network controller in a mobile communication system in which same downlink signals can be transmitted to a mobile station via a plurality of base stations, comprising:
   an acquirer configured to acquire a selective combining result in the mobile station;
   a determiner configured to determine, based on an acquired selective combining result, whether or not to transmit the same downlink signals to the mobile station via a first base station managing a first cell in which the mobile station is located and a second base station managing a second cell adjacent to the first cell; and
   an instructor configured to instruct the second base station to stop transmitting the downlink signal to the mobile station.

5. A mobile communication control method, comprising:
   measuring, in a mobile station, a reception quality of a downlink signal received via a first base station managing a first cell in which the mobile station is located;
   acquiring, in a radio network controller, the reception quality in the mobile station;
   determining, in the radio network controller, based on an acquired reception quality, whether or not to transmit same downlink signals to the mobile station via a first base station managing a first cell in which the mobile station is located and a second base station managing a second cell adjacent to the first cell;
   instructing, in the radio network controller, the second base station to transmit the downlink signal to the mobile station; and
   performing, in the mobile station, combining process on the same downlink signals received via the first base station and the second base station.

6. A mobile communication control method, comprising:
   acquiring, in a radio network controller, location information of a mobile station;
   determining, in the radio network controller, based on acquired location information, whether or not to transmit same downlink signals to the mobile station via a first base station managing a first cell in which the mobile station is located and a second base station managing a second cell adjacent to the first cell;
   instructing, in the radio network controller, the second base station to transmit the downlink signal to the mobile station; and
   performing, in the mobile station, combining process on the same downlink signals received via the first base station and the second base station.

7. A mobile communication control method, comprising:
   performing, in a mobile station, selective combining process on same downlink signals received via a first base station managing a first cell in which the mobile station is located and a second base station managing a second cell adjacent to the first cell;
   acquiring, in a radio network controller, a result of the selective combining process in the mobile station;
   determining, in the radio network controller, based on an acquired result of selective combining process, whether or not to transmit the same downlink signals to the mobile station via the first base station and the second base station; and
   instructing, in the radio network controller, the second base station to stop transmitting the downlink signal to the mobile station.

* * * * *